(No Model.)
J. HOSEY.
WINDMILL.
No. 464,224.  Patented Dec. 1, 1891.
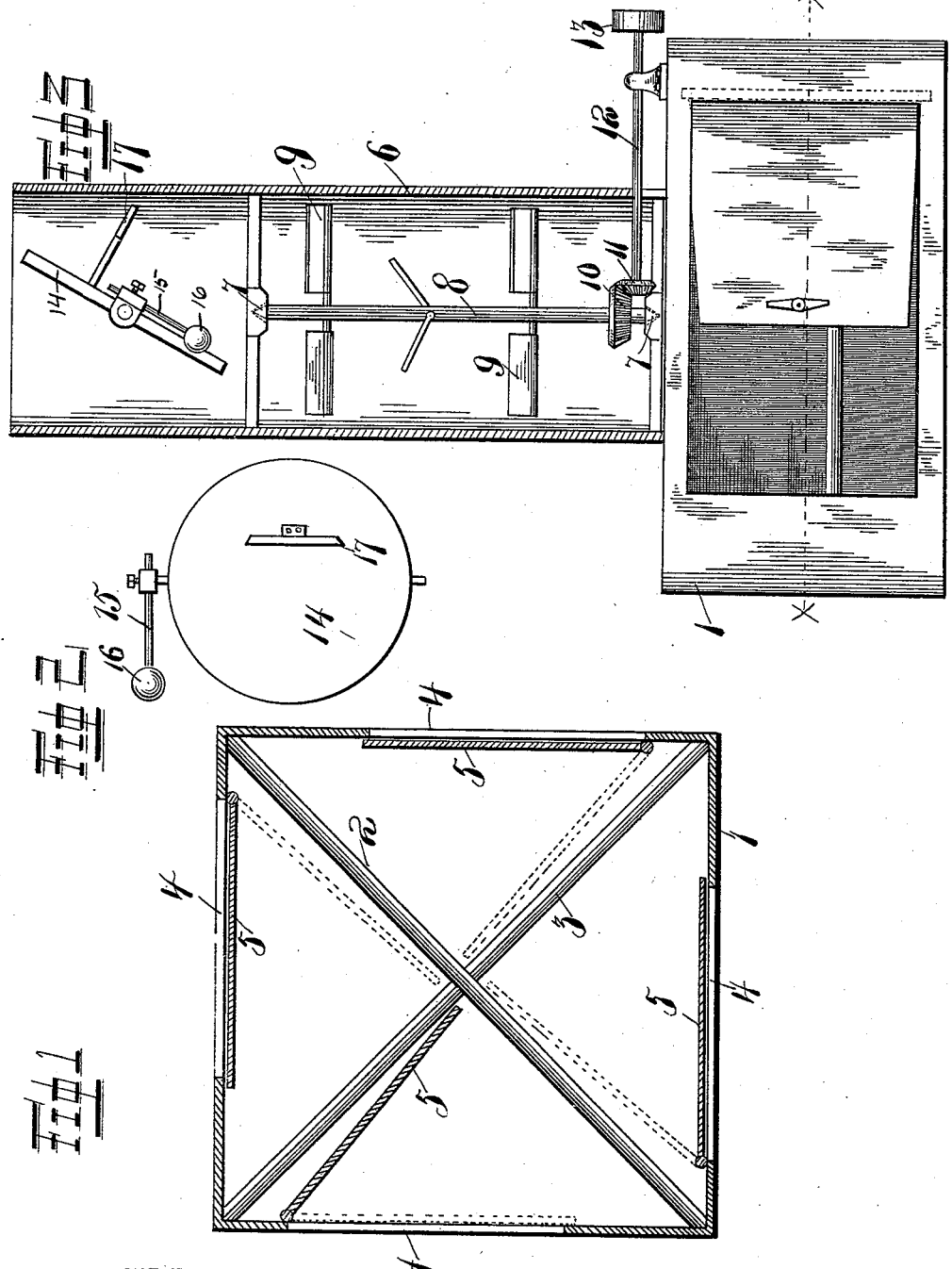
WITNESSES
A. A. Eicke.
Ed. E. Longan
INVENTOR
James Hosey
by Higdon & Higdon, Attorneys

UNITED STATES PATENT OFFICE.

JAMES HOSEY, OF ST. LOUIS, MISSOURI.

WINDMILL.

SPECIFICATION forming part of Letters Patent No. 464,224, dated December 1, 1891.

Application filed July 20, 1891. Serial No. 400,133. (No model.)

*To all whom it may concern:*

Be it known that I, JAMES HOSEY, of the city of St. Louis, in the State of Missouri, have invented certain new and useful Improvements in Windmills, of which the following is a full, clear, and exact description, reference being had to the accompanying drawings, forming a part hereof.

My invention relates to improvements in windmills; and it consists in the novel arrangement and combination of parts, as will be more fully hereinafter described, and designated in the claims.

In the drawings, Figure 1 is a cross-section taken on the line $x\,x$ of Fig. 3. Fig. 2 is a detail plan view of the draft-regulating valve; and Fig. 3 is a vertical longitudinal section of the draft flue or chimney, and also a side elevation of the mechanism from which the same is supported.

I will give a description of the object and advantages of my invention in connection with the mechanical description thereof.

Referring to the drawings, 1 indicates a box of any suitable mechanical construction. Said box is adapted to be secured or is secured when the windmill is in use on any ordinary frame-work as used in the construction of windmills. Located in said box 1, and arranged at right angles relative to each other, are cross-bars 2 and 3, for the purposes more fully hereinafter described. Said box 1 is provided on the sides with openings 4, through which the wind may enter into the inside of the box. Hinged to the inside of said box, in any suitable and mechanical manner, are a series of doors 5, which are adapted when shut to close the openings 4. Said doors 5 are free to open from the action of the wind and swing backwardly until they come in contact with the cross pieces or bars 2 and 3, as is illustrated in Fig. 1, wherein one of the doors 5 is illustrated as being opened and resting against the cross-piece 3, and the remaining doors are represented as being closed, and also the open position of the same being illustrated in dotted lines. It can be seen from this construction, for instance, for illustration referring to Fig. 1 and conceiving the wind to strike the left-hand door, as illustrated in said figure, the pressure thereof will open the left-hand door, as illustrated in said figure, and will also close the remaining three doors, as is also illustrated in said figure. A similar operation will take place—that is, one of the doors will be opened and the remaining three closed—no matter whether the wind is from the north, east, south, or west, it being premised that the box 1 is located upon a suitable frame-work due north or south or east and west.

If the wind strikes the box 1 at one of the corners thereof, or is from a northeastwardly, northwestwardly, southeastwardly, or southwestwardly direction, two of the adjacent doors 5 will be opened and the remaining doors closed; or, in other words, some one of the doors 5 will be opened, no matter from what direction the wind blows, and consequently the remaining doors will be closed. Secured to said box 1, and in communication therewith, is a draft-flue 6 of the construction as illustrated in Fig. 3. Said draft-flue 6 may be located on top of said box 1, as illustrated in said figure, or it may be secured to the bottom of the same without departing from the nature of my invention. Said draft-flue 6 may be made of any suitable dimensions, and is also in direct communication with the interior space with box 1, as heretofore stated.

The wind or breeze that enters into either of the openings 4 will open the door 5 that closes the same, and consequently close the remaining doors 5, as hereinbefore stated. When said remaining doors are closed, the wind or breeze will be restrained and caused to be deflected and pass up through flue 6. Pivotally mounted in said draft-flue 6, in any suitable and mechanical bearings, such as 7, is a vertical shaft 8. Mounted on said vertical shaft 8 in any suitable and mechanical manner is a series of revolving sails 9, which are acted upon by the wind, whereby motion is imparted to the vertical shaft 8, and consequently to the other mechanism. It may be noted in this connection that the sails 9 revolve in a horizontal direction.

Rigidly mounted on the lower end of the vertical shaft 8 is a bevel-gear pinion 10, which is adapted to mesh with a similar pinion 11, and said pinion 11 imparts a rotary motion to the horizontal shaft 12, and mounted on the horizontal shaft 12 is a belt-pulley 13, or any other desired mechanical operating device.

Pivotally secured in the upper portion of the draft-flue 6 is a draft regulating or controlling damper 14 of the construction as illustrated in Figs. 2 and 3. Secured to said damper 14, in any suitable and mechanical manner, is an adjustable stem 15, carrying a gravity-weight 16, the normal position of which, when in use, is depending vertically, and also secured to said damper 14 and occupying a position at right angles to said adjustable stem 15 is a feather 17, which is adapted to be struck and elevated by the ascending current of air in the draft-flue 6. The object of this damper, as hereinbefore stated, is to control or regulate the draft of said flue 6, in the manner as I will now proceed to describe. The normal position of the damper is shown in Fig. 3. The pressure of the air when moderate will act on feather 17 and cause the damper to assume a vertical position, leaving the maximum amount of open space on both sides. It is evident that a greater pressure will drive the upper end of the damper over still farther, or until the lower end thereof prevents the wind from striking the feather 17 directly, thereby partly closing the passages on each side, lessening the draft, and regulating the revolutions on the wheel. By this construction it can be readily perceived that a storm does not increase the velocity of the revolving sails 9; or, in other words, the windmill is perfectly operative in a storm, and is not liable to be injured thereby, as is the ordinarily-constructed windmill.

Having fully described my invention, what I claim is—

1. In a windmill, a box 1, having apertures in each side thereof, diagonal cross-bars 2 and 3 in said box, inwardly-opening doors closing the apertures and adapted to have their movement limited by said cross-bars, a draft-flue mounted on said box and communicating with the interior thereof, and a wind-wheel in said flue, whereby the pressure of the wind will automatically open one or more of the doors and at the same time close the remainder, thereby deflecting the air upward against the wheel, substantially as described.

2. A windmill consisting of a box or drum 1, the same being provided with lateral inlet air-openings 4, a series of doors 5, adapted to close said openings from the inside, cross-bars 2 and 3, arranged at right angles to prevent said doors opening beyond an acute angle, a draft-flue 6, secured to said box 1 and in communication therewith, a shaft 8, carrying a series of revolving sails mounted in said flue, a damper or valve 14, pivotally mounted in said flue, the same carrying a feather 17 and gravity-weight 16, substantially as set forth.

In testimony whereof I affix my signature in presence of two witnesses.

JAMES HOSEY.

Witnesses:
ED. E. LONGAN,
A. A. EICKS.